(12) United States Patent
Gilbreath et al.

(10) Patent No.: US 9,366,836 B2
(45) Date of Patent: Jun. 14, 2016

(54) FIBER CABLE AND DROP WIRE ORGANIZER

(71) Applicant: Hubbell Incorporated, Shelton, CT (US)

(72) Inventors: Kyle Bradford Gilbreath, Atlanta, GA (US); Joseph Forrester, Auburn, GA (US); Joshua Charles Wilson, Moody, AL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 14/489,095

(22) Filed: Sep. 17, 2014

(65) Prior Publication Data

US 2015/0131957 A1   May 14, 2015

Related U.S. Application Data

(60) Provisional application No. 61/879,477, filed on Sep. 18, 2013, provisional application No. 62/037,820, filed on Aug. 15, 2014.

(51) Int. Cl.
| | |
|---|---|
| *G02B 6/00* | (2006.01) |
| *G02B 6/44* | (2006.01) |
| *F16L 3/06* | (2006.01) |
| *G02B 6/48* | (2006.01) |

(52) U.S. Cl.
CPC ............... *G02B 6/4446* (2013.01); *F16L 3/06* (2013.01); *G02B 6/4459* (2013.01); *G02B 6/4471* (2013.01); *G02B 6/483* (2013.01); *Y10T 29/49895* (2015.01)

(58) Field of Classification Search
CPC .. G02B 6/4452; G02B 6/3897; G02B 6/4471; G02B 6/4454; G02B 6/00
USPC ................................. 385/134, 135, 136, 137
See application file for complete search history.

(56) References Cited

U.S. PATENT DOCUMENTS

| | | | |
|---|---|---|---|
| 5,097,529 A | 3/1992 | Cobb et al. | |
| 5,109,467 A | 4/1992 | Hogan et al. | |
| 5,285,515 A | 2/1994 | Milanowski et al. | |
| 5,724,469 A | 3/1998 | Orlando | |
| 5,867,624 A | 2/1999 | Forrester et al. | |
| 6,311,006 B1 | 10/2001 | Forrester et al. | |
| 6,898,363 B2 | 5/2005 | Forrester et al. | |
| 7,038,137 B2 * | 5/2006 | Grubish | G02B 6/4442 174/72 R |
| 7,085,468 B2 | 8/2006 | Forrester | |
| 7,477,829 B2 | 1/2009 | Kaplan | |
| 8,374,477 B2 | 2/2013 | Hill | |
| 2005/0111810 A1 * | 5/2005 | Giraud | G02B 6/4455 385/135 |
| 2005/0145522 A1 | 7/2005 | Bloodworth et al. | |

OTHER PUBLICATIONS

PCT/US14/056271 International Search Report and Written Opinion issued Dec. 31, 2014.

* cited by examiner

*Primary Examiner* — Jennifer Doan
(74) *Attorney, Agent, or Firm* — Michael Best & Friedrich, LLP (57) ABSTRACT

A cable supporting device includes a first support and a second support. The first and second supports have respective first and second channel members with an inwardly facing opening. The channel members support and retain a cable or fiber optic component, for example a fiber optic cable or drop wire. The supports may be used in an enclosure or suspended from an aerial transmission line.

20 Claims, 10 Drawing Sheets

FIBER CABLE AND DROP WIRE ORGANIZER

RELATED APPLICATIONS

This application claims the benefit of U.S. Provisional Application Ser. No. 61/879,477, filed on Sep. 18, 2013 and U.S. Provisional Application Ser. No. 62/037,820, filed on Aug. 15, 2014, the disclosures of which are hereby incorporated by reference in their entirety.

FIELD

Various exemplary embodiments relate to a support for a fiber optic component and fiber cable and drop wire organizers, for example, an apparatus for supporting multiple lengths of fiber optic cable or drop wire while maintaining a specified minimum bend radius.

BACKGROUND

Modern telecommunication systems utilize a number of materials and mediums to transmit information. Recently, cables, such as fiber optic cables, have become more popular in the communication industry and have begun to replace electrical wires. Fiber optic cables include transparent optical fibers made of glass or plastic and are capable of transmitting voice, video, and data. Compared to electrical wires, fiber optic cables permit signals to travel longer distances with less loss and less electromagnetic interference.

One type of fiber optic cable used to transmit data across aerial transmission lines is all-dielectric self-supporting (ADSS) cables. Such cables typically have a strong non-metallic sheath that supports the optical fibers making up the cable. An ADSS cable may also have a reinforcing strand at its core. All-dielectric cable has the advantage that it can be used in close proximity to electrical power lines, whereas conventional communication cables are required to be run in a separate zone, usually at least forty inches below the power cables and above ground neutral. Other types of fiber optic cable lines include, encased with ground wire, encased within phase conductor, and wrapped around phase conductor or ground wire cables.

Fiber optic cable is typically installed on aerial transmission routes in long lengths so as to minimize the number of splices, each of which degrades optical signals and is expensive. Because of certain problems related with splicing, such as expense and the induced increase in noise, it is generally more desirable to overbuild the amount of cable used and store the excess cable, as opposed to splicing and adding cable in the future. To allow for rerouting, due to pole movement and for repairs, slack is provided in the form of surplus lengths of cable at intervals along the route.

While fiber optic drop wire is similar to fiber optic cable, drop wire has some distinctive characteristics. Like fiber optical cable, fiber optic drop wire must be provided with means for supporting a surplus length of drop wire and protecting it against over-bending. In the case of fiber optic cable, any surplus length of cable is contiguous with the main run. However, in the case of fiber optic drop wire, a surplus length of drop wire must be provided in conjunction with a separate independent run that is directed away from the main run of cable in order to terminate at the subscriber location. The fiber optic drop wire originates from a closure connected to the main cable run where, most often, multiple drop wires also originate to be routed to various different subscriber locations.

Storing surplus cable poses problems as optical cable has a minimum bend radius and is vulnerable to damage (fiber breakage) from bending and twisting, if the minimum radius is exceeded.

SUMMARY

According to an exemplary embodiment, a cable supporting device includes a first support and a second support. The first support includes a first channel member having a top wall, a bottom wall, and a side wall each having a first side section, a second side section, and a curved section connecting the first and second side sections. The first channel member bounds a first interior portion and has an opening facing the first interior portion. The second support is positioned opposite the first support and includes a second channel member having a top wall, a bottom wall, and a side wall each having a first side section, a second side section, and a curved section connecting the first and second side sections. The second channel member bounds a second interior, and has an opening facing the second interior.

According to another exemplary embodiment, a cable organizer includes a base, a first support, and a second support. The first support is connected to the base and includes a first channel member having a top wall, a bottom wall, and a side wall each having a first side section, a second side section, and a curved section connecting the first and second side sections. The first channel member bounds a first interior portion and has an opening facing the first interior portion. The second support is connected to the base opposite the first support and includes a second channel member having a top wall, a bottom wall, and a side wall each having a first side section, a second side section, and a curved section connecting the first and second side sections. The second channel member bounds a second interior, and has an opening facing the second interior.

Another exemplary embodiment is directed to a method of organizing fiber optic cable and drop wires. A fiber optic cable is inserted into an enclosure containing an organizer. The organizer includes a base plate, a first support connected to the base plate, a second support connected to the base plate, and a guide clip. The first support has a first channel member with a curved region and a first open side. The second support is aligned with the first support and has a second channel member with a curved region and a second open side. The fiber optic cable is passed through at least one of the guide clips. A drop wire is separated from the fiber optic cable and at least a portion of the drop wire is placed into the first channel member and the second channel member.

BRIEF DESCRIPTION OF DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

A fiber optic network can include a main run of fiber optic cable originating from a source or distributor. Along the length of the main run, the fiber optic cable can be diverted or branched off at various locations near concentrations of customers, for example neighborhoods. The main run cable, or a split of the main run cable, is directed into an enclosure. In the enclosure, the cable is separated into a number of individual drop wires. The number of drop wires can depend on the location and be chosen by the fiber optic company. The drop wires are then connected or run to individual customer locations. More than one company can share or utilize the same enclosure, for example a phone company and a cable company. Because of the multiple drop wires, it is important to keep the wires organized. Storing the drop wires without organization can lead to tangles and create confusion that can result in disruption of service, additional expense, and additional service or installation time if one or more of the wires needs to be serviced or moved.

Figure 1:
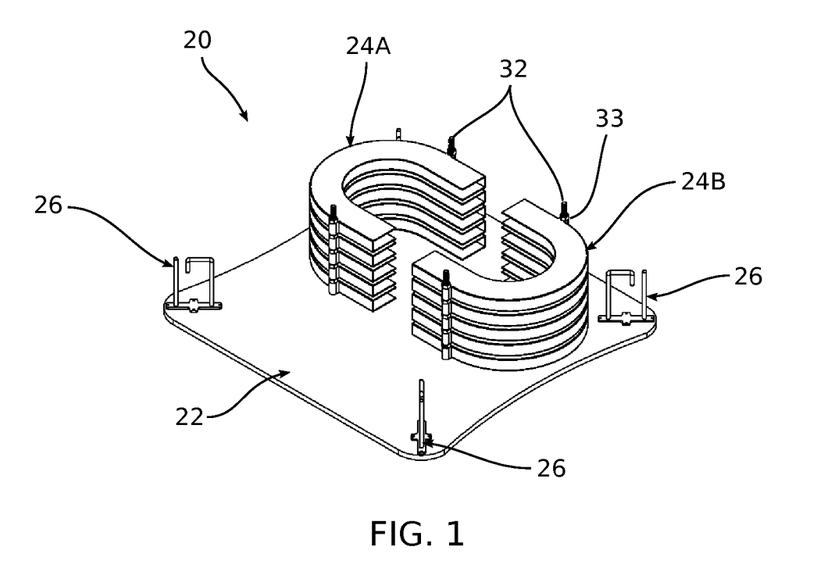
FIG. 1 is a perspective view of an exemplary cable and wire organizer.
Figure 2:
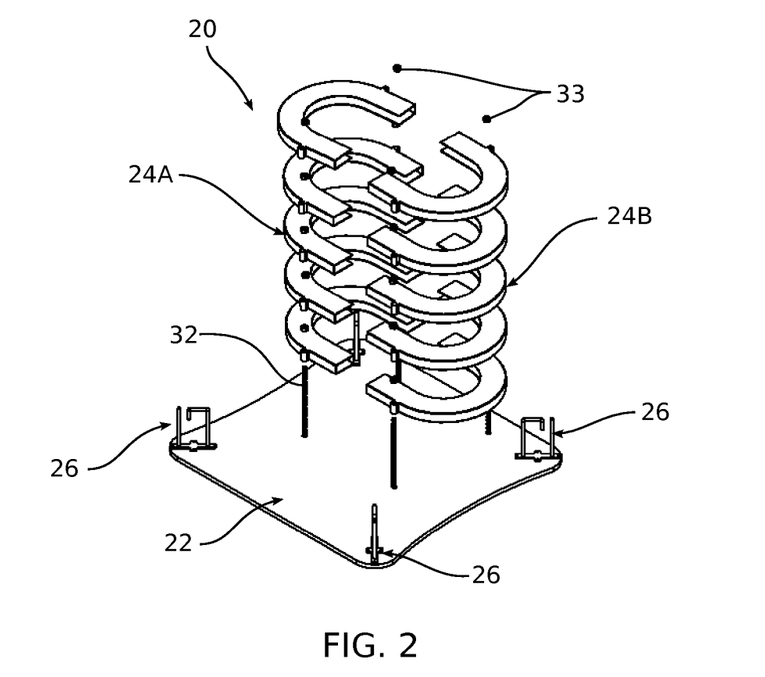
FIG. 2 is an exploded view of the cable and wire organizer of FIG. 1.

According to various exemplary embodiments, an organizer 20 includes a base plate 22, at least one wire support 24, for example a first set of wire supports 24A and a second set of wires supports 24B and at least one guide clip 26. The organizer 20 can be positioned inside of an enclosure 28, for example a vault type enclosure that is placed in the ground and sealed with a removable cover, or a pedestal type enclosure that is positioned off the ground. The organizer 20 can be hung on a side of the enclosure 28, for example using mounting brackets or fasteners, or placed into the bottom of the enclosure 28. Releasable securing the organizer 20 to the enclosure 28 allows it to be quickly removed when it is necessary to add, replace, re-route or remove drop wires, with no disruption or disconnection of any of the other drop wires. Lengths of individual drops are independently stored in the wire supports 24 and can be accessed without disturbing any other drop.

Figure 3:
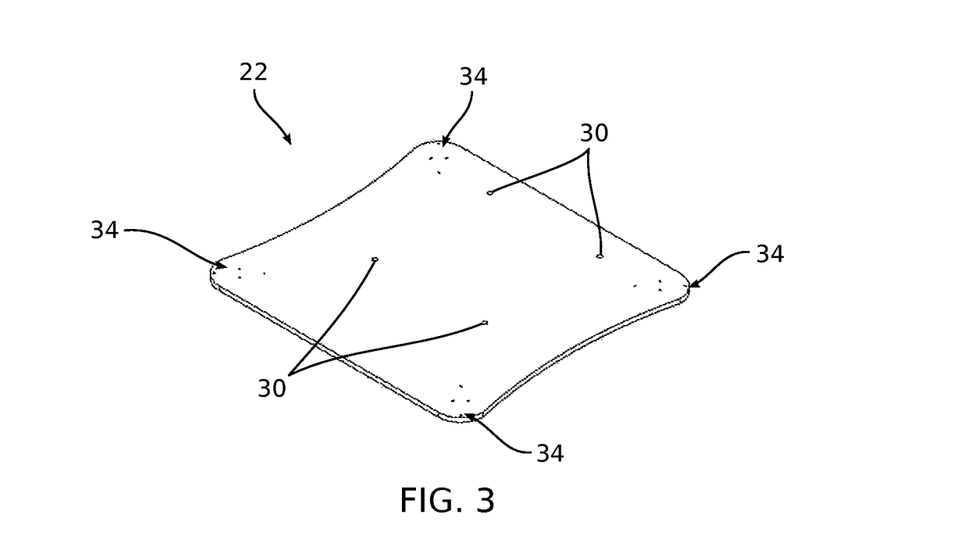
FIG. 3 is a perspective view of an exemplary base plate.
Figure 4:
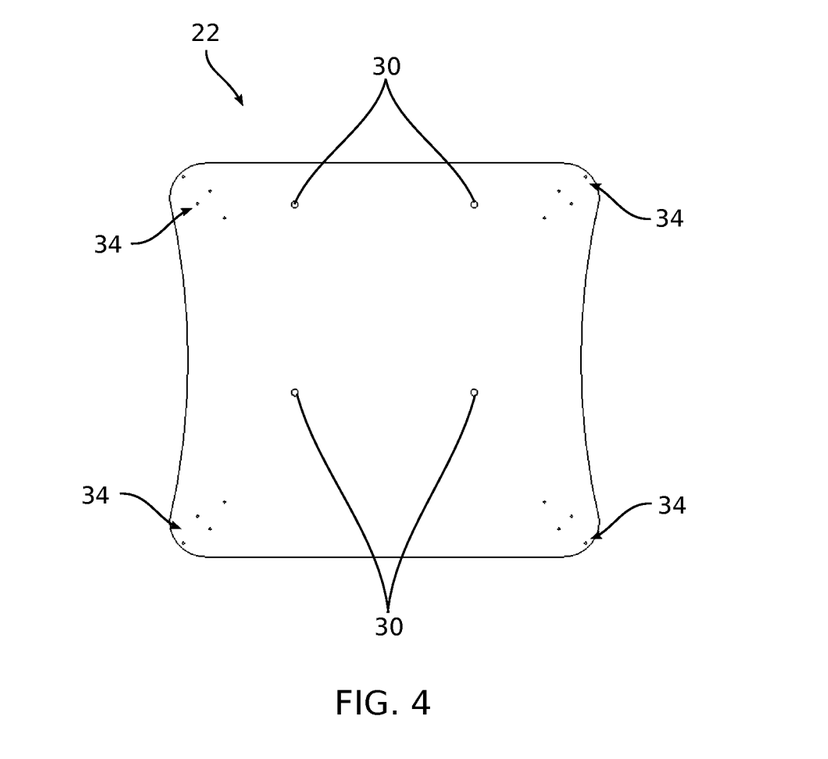
FIG. 4 is a top view of the base plate of FIG. 3.

In various exemplary embodiments, the base plate 22 is a substantially planar member having a pair of straight edges, a pair of curved edges, and rounded corners. In various alternative embodiments, any combination of curved and straight edges may be used for the base plate 22, including only rectilinear or curvilinear edges. Different sizes, shapes, and configurations of the base plate 22 can be used depending on the enclosure 28 and the associated components. The base plate 22 includes a plurality of apertures for receiving fasteners to mount components to the base plate 22. A set of first apertures 30 are positioned at a first region of the base plate 22. The first apertures 30 receive a respective fastener, for example a bolt 32. The bolt 32 extends upwardly from the base plate 22 to connect one or more wire supports 24. The wire supports 24 can be secured to the bolts 32 using nuts 33. In the exemplary embodiment, four first apertures 30 are positioned to connect to two sets of wire supports 24A, 24B. Sets of second apertures 34 are positioned at each of the corners of the base plate 22 to receive fasteners to connect the guide clips 26. In the exemplary embodiment, each set of second apertures 34 includes four apertures arranged in a diamond configuration, although any number of apertures may be used depending on the guide clips 26. The size, spacing, and configuration of the second apertures 34 can also depend on the guide clips 26. The base plate 22 may be made from a plastic, metal, ceramic, or composite material, or any combination thereof. In various exemplary embodiments, the base plate is made from metal, a hard plastic, or any other rigid material.

Figure 5:
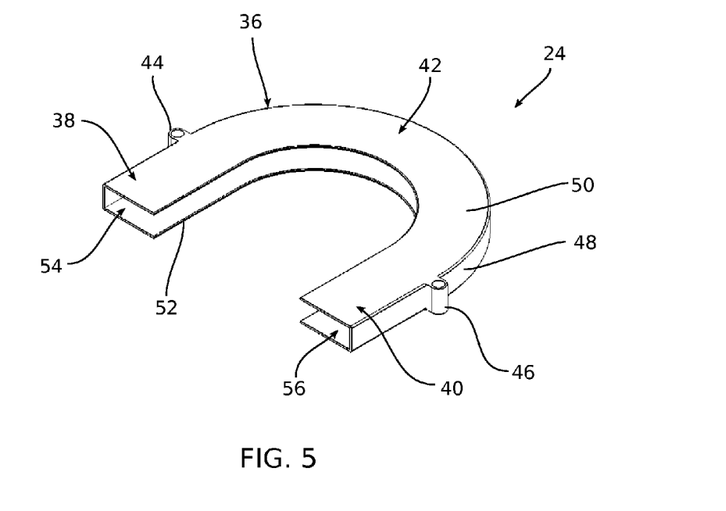
FIG. 5 is a perspective view of an exemplary wire support.
Figure 6:
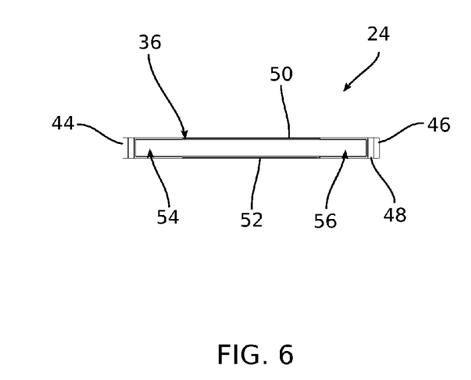
FIG. 6 is a front view of the wire support of FIG. 5.
Figure 7:
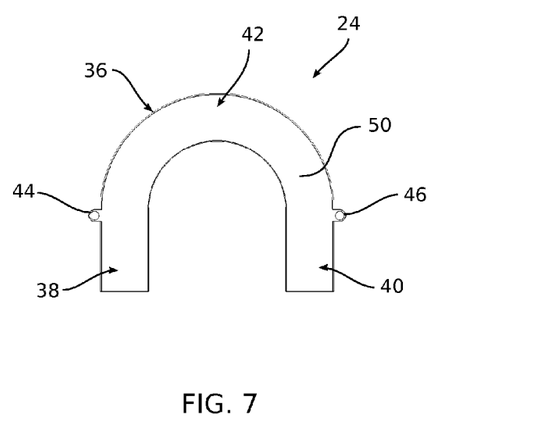
FIG. 7 is a top view of the wire support of FIG. 5.
Figure 8:
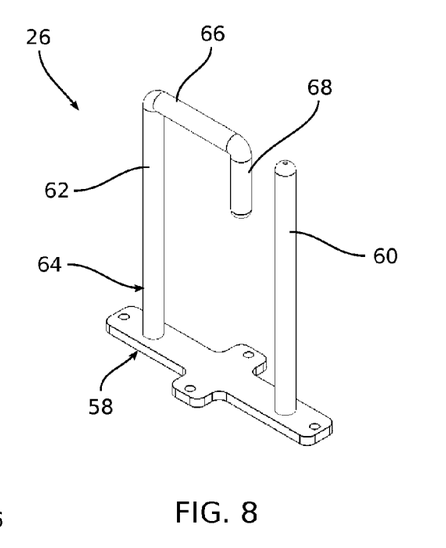
FIG. 8 is a perspective view of an exemplary guide clip.
Figure 9:
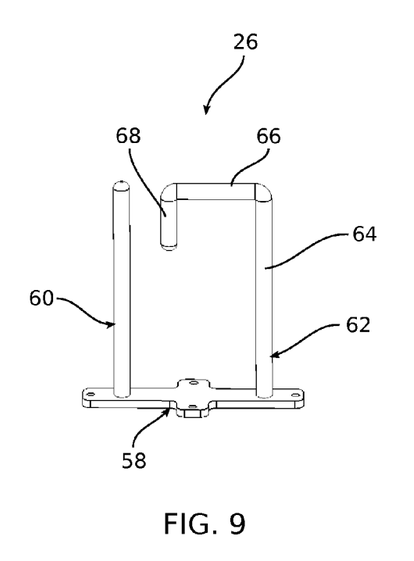
FIG. 9 is a side perspective view of the guide clip of FIG. 8.
Figure 10:
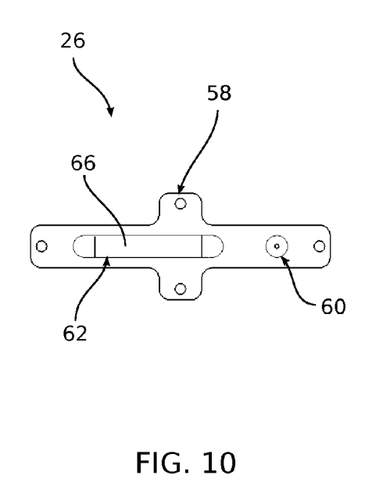
FIG. 10 is a top view of the guide clip of FIG. 8.
Figure 11:
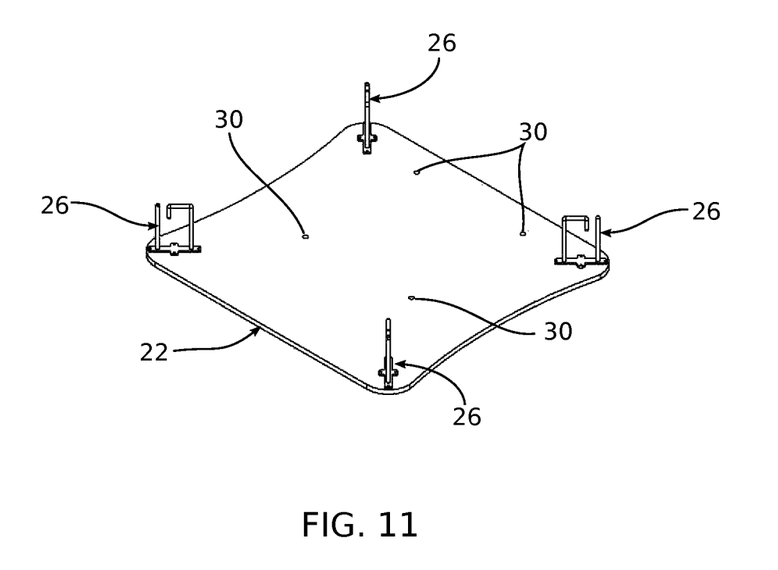
FIG. 11 is a perspective view of an exemplary base plate with guide clips attached.

In an exemplary embodiment, the wire support 24 includes a channel member 36 having a curved region that retains a section of a cable approximately at or above a minimum bend radius associated with the cable or a drop wire. In the exemplary embodiment, the wire support 24 has a substantially U-shaped or horseshoe-shaped channel member 36 having an open front, a first side section 38, a second side section 40, and a back section 42. The back section 42 has one or more curved regions, or a continuously curved region, that supports a section of a cable or fiber optic component, for example a fiber optic cable or drop wire, approximately at or above a minimum bend radius associated with the component. The channel member 36 bounds an interior portion between the first and second side sections 38, 40 and the back section 42. A first protrusion 44 extends from the first side section 38 and a second protrusion 46 extends from the second side section 40. The first and second protrusions 44, 46 include an aperture for receiving the bolt 32 to mount the wire support 24 to the base plate 22. The channel member 36 includes an outer wall 48, a top wall 50, a bottom wall 52, a first open end 54, and a second open end 56. The top and bottom walls 50, 52 extend from the outer wall 48 towards the interior of the wire support 24 to create an inward facing channel member 36. Various sizes, shapes, and configuration of channel member 36 can be used. The wire support 24 may be made from a plastic, metal, ceramic, or composite material, or any combination thereof. In various exemplary embodiments, the wire support is made from metal, hard plastic, or any other rigid material.

The inward facing channel member 36 provides at least one advantage over a wire support having an outward or upward facing channel. For example, cable or drop wire stored in the wire support will have a tendency to bow outward or upward, potentially displacing the wires from the channel and the support. An inwardly facing channel member 36 resists the outward movement and helps to retain the drop wire in the wire support 24.

In an exemplary embodiment, the guide clip 26 includes a base 58, a first protrusion 60, and a second protrusion 62. The base 58 has a substantially cross configuration with arms intersecting at right angles, although various shapes, sizes, and configurations can be used. The base 58 includes one or more openings, for example four openings, for receiving fasteners to mount the guide clips 26 to the base plate 22. Other methods of mounting the guide clips 26 to the base plate 22 may be used. The first protrusion 60 has a substantially cylindrical configuration and extends upwardly from the base 58. The second protrusion 62 has a first portion 64 extending upwardly from the base 58, a second portion 66 extending outwardly from the first portion 64, and a third portion 68 extending downwardly from the second portion 66. The first, second, and third portions 64, 66, 68 have a substantially cylindrical configuration. In an exemplary embodiment, the second portion 66 extends substantially perpendicular to the first portion 64 and the third portion 68 extends substantially perpendicular to the second portion 66, although other angles may be used. The guide clips 26 are positioned near the corners of the base plate 22 with the first protrusion 60 positioned proximate to the edge of the base plate 22 with respect to the second protrusion 62.

Figure 12:
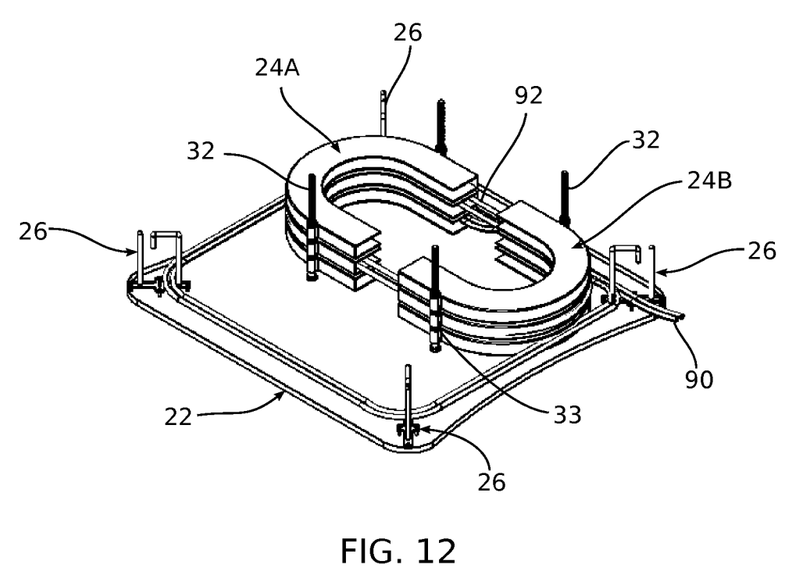
FIG. 12 is a perspective view of an exemplary wire organizer with fiber optic cable and drop wires.

As best shown in FIGS. 1, 2, and 12, and according to various exemplary embodiments, a plurality of first and second wire supports 24A, 24B are connected to the base plate 22. The wire supports 24A, 24B are positioned in sets of two with one opposing the other. Although, the first and second sets of wire supports 24A, 24B are shown as identical, different configurations, shapes, and sizes can be used for the first set of wire supports 24A and the second set of wire supports 24B. First and second bolts 32 extend through the base plate 22 and through the first and second protrusions 44, 46 of each wire support 24A, 24B. First and second nuts 33 are connected the first and second bolts 32 to secure each wire support 24A, 24B. In an exemplary embodiment, a set of nuts 33 is positioned between respective wire supports 24A. The number of wire supports 24A, 24B and their spacing from each other can be varied depending on the amount of drop wire to be retained in the enclosure 28. In an exemplary embodiment, the height of the channel 36 is sufficient to accommodate several loops of drop wire. The inherent stiffness of the fiber drop wire makes it want to expand in the channel 36, so that the drop wire remains secure against the outer wall 48 and between the top and bottom walls 50, 52 of the channel 36; thus, no bands or other restraints are necessary.

Figure 13:
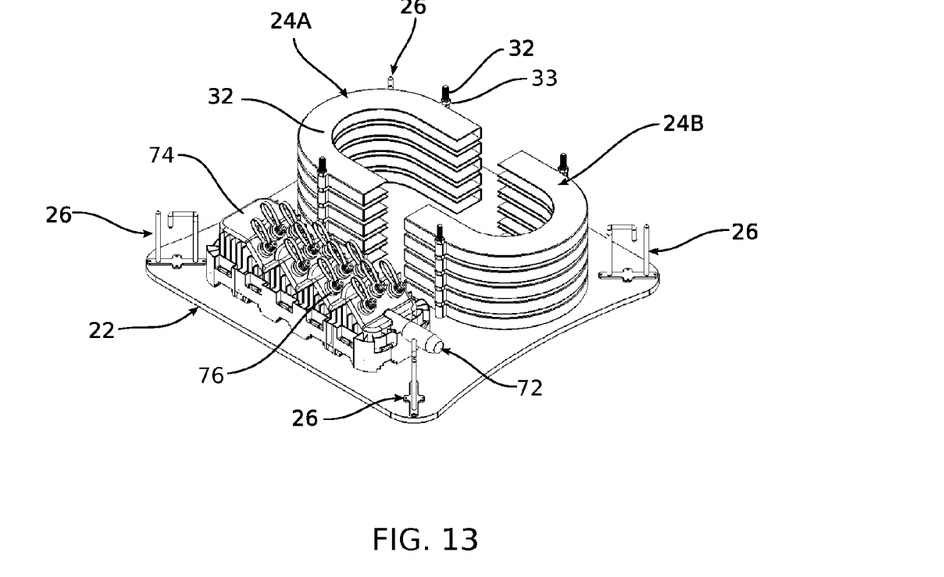
FIG. 13 is a perspective view of an exemplary wire organizer used in connection with a multi-port terminal.

FIG. 13 depicts an exemplary embodiment where a multi-port drop wire connection terminal 72 is connected to the base plate 22. The terminal 72 includes a housing 74 and a plurality of ports 76 to connect fiber optic drop wires. The size, configuration, and number of ports 76 can vary as would be understood by one of ordinary skill in the art. The terminal 72 is commercially available from several retailers, for example, the CORNING® OPTISHEATH® line of connection terminals. The connection of the terminal 72 to the base plate 22 depends on the make and model of the terminal 72, and may include straps or fasteners (not shown).

Figure 14:
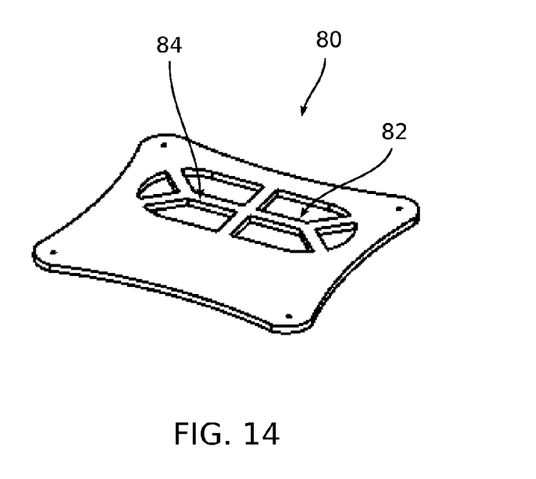
FIG. 14 is a perspective view of another exemplary base plate.
Figure 15:
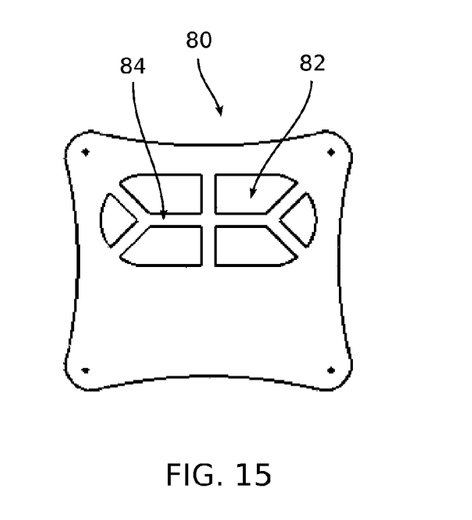
FIG. 15 is a top view of the base plate of FIG. 14.
Figure 16:
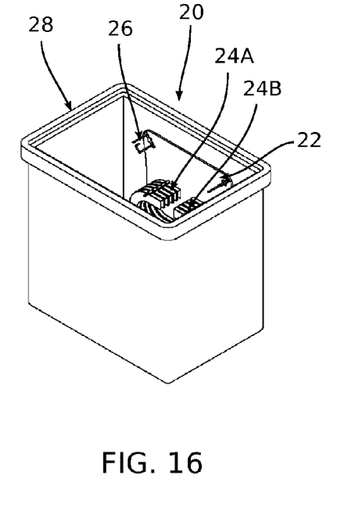
FIG. 16 is a perspective view of an exemplary organizer attached to an enclosure.
Figure 17:
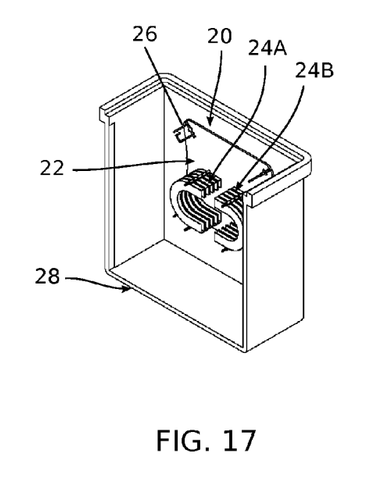
FIG. 17 is a perspective view of the organizer and enclosure of FIG. 16 with the front wall removed.

FIGS. 14 and 15 depict another exemplary embodiment of a base plate 80 having a plurality of openings 82. Six separate openings 82 are shown, having a combination of linear and curved edges. The openings 82 are divided by supports 84. In the exemplary embodiment, the openings 82 and the supports 84 have a combined overall, substantially obround configuration. The openings 82 are sized to allow one or more lengths of optic cable or drop wire to pass therethrough. For example, individual openings 82 can have a width at least the size of the first side section 38 of the wire support 24, although smaller and larger sizes may be used. In an exemplary embodiment, the combined area of the openings 82 and the supports 84 is approximately at least equal to the combined area of the interior portion bounded by the first and second wire supports 24A, 24B or at least approximately the area bounded by the outer edges of the first and second wire supports 24A, 24B. The wire supports 24A, 24B are connected to the base plate 80 substantially over or around the openings 82. In certain embodiments, when the base plate 80 is mounted to the side or bottom of an enclosure 28, the fiber optic cable passes through the same wall of the enclosure 28 on which the base plate 80 is mounted. The openings 82 allow the cable and/or drop wires to be passed through the baseplate 80, ensuring easy handling regardless of the configuration.

Figure 18:
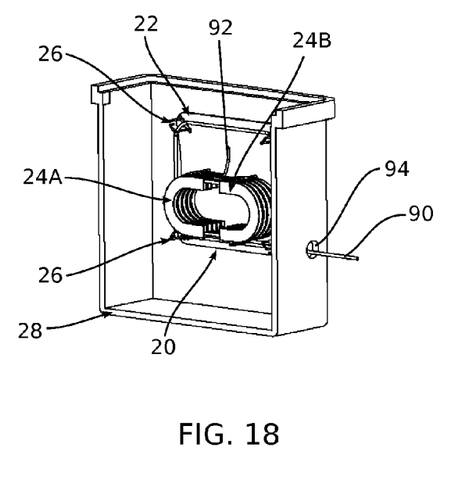
FIG. 18 is a perspective view of the organizer and enclosure of FIG. 17 with a cable and drop wires interested in to the organizer.
Figure 19:
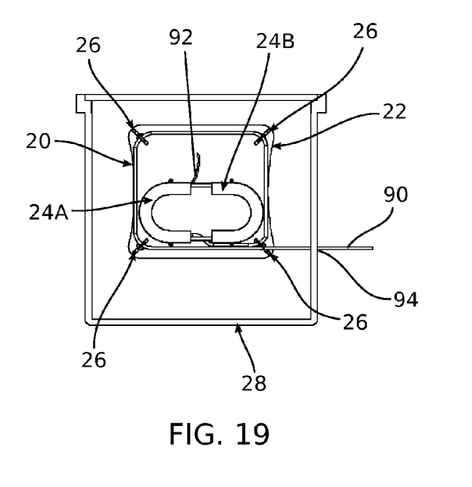
FIG. 19 is a front view of the organizer and enclosure of FIG. 18.

FIGS. 16-19 show an exemplary embodiment of the organizer 20 mounted into an enclosure 28, with FIGS. 18 and 19 showing an exemplary embodiment where a fiber optic cable 90 is inserted into the enclosure 28 and separated into a plurality of drop wires 92. The cable 90 is inserted into an aperture 94 in the enclosure 28. In an exemplary embodiment, the cable 90 is passed around one or more of the guide clips 26. The cable 90 can be passed around the guide clips 26 multiple times, storing extra lengths of cable 90 encase it is needed, for example, if the enclosure 28 or the main run of cable needs to be moved. The cable 90 is separated into a plurality of drop wires 92. In an exemplary embodiment, the cable 90 is introduced into a terminal 72 and split into two or more drop wires 92, for example 2, 4, 6, 8, 10, or 12 drop wires 92.

Splitting the cable 90 can lead to a large number of drop wires 92 in a small space. To keep the drop wires 92 organized, each drop wire 92 is positioned in a wire guide 24. For example, a first set of wire supports 24A and an oppositely opposed second set of wire supports 24B positioned on the base 22. The opposed channels 36 of the wire supports 24A, 24B effectively form a set of tracks, for example an obround track, with each track capable of receiving one or more drop wires 92 and also multiple loops of one or more drop wires 92. The drop wires 92 can exit the enclosure (not shown) to be connected to a customer location. Extra lengths of drop wires 92 are stored encase the enclosure 28 or the end location of the drop wire 92 needs to be moved. Surplus, unused drop wires 92 can also be stored in the wire supports 24A, 24B. The enclosure 28 may utilize as few as one set of wire supports 24A, 24B, up to as many wire supports 24A, 24B as there are drop wires 92 present in the enclosure. An installer can remove or add sets of wire supports 24A, 24B as needed, for example by positioning an extra set of supports 24A, 24B on the bolt 32 and securing the supports 24A, 24B with nuts 33. In certain embodiments, the wire supports 24A, 24B can also be used to store surplus lengths of the main cable 90. The guide clips 26 can also be used to guide the drop wires 92 or store surplus lengths of drop wire 92 as needed. The organizer 20 enables surplus cable 90 and drop wires 92 to be stored in an effective manner that can help prevent or reduce tangling and help an installer to properly identify individual drop wires 92.

Figure 20:
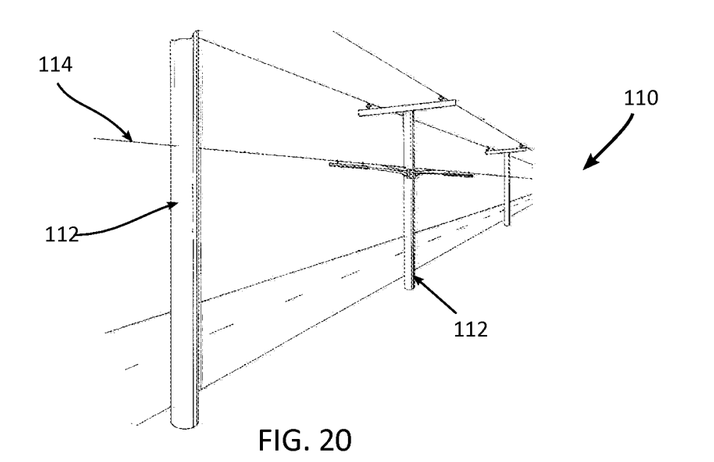
FIG. 20 is a perspective view of a transmission line according to an exemplary embodiment.
Figure 21:
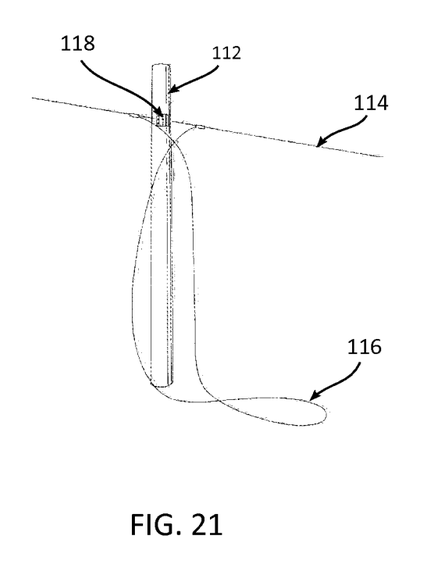
FIG. 21 is a perspective view of a transmission line and cable loop according to an exemplary embodiment.

FIG. 20 depicts an exemplary embodiment of an overhead transmission line 100 carrying a main fiber run including a series of poles 112 inserted into the ground supporting standard power transmission lines and a fiber optic cable line 114. The poles 112 utilize different clamps and connectors for the power and fiber optic cable lines 114. One or more poles 112 include a surplus length or loop 116 of cable as depicted in FIG. 21. A cable guide 118 having one or more slots is attached to the pole 112 to assist in guiding and supporting the cable loop 116.

Figure 22:
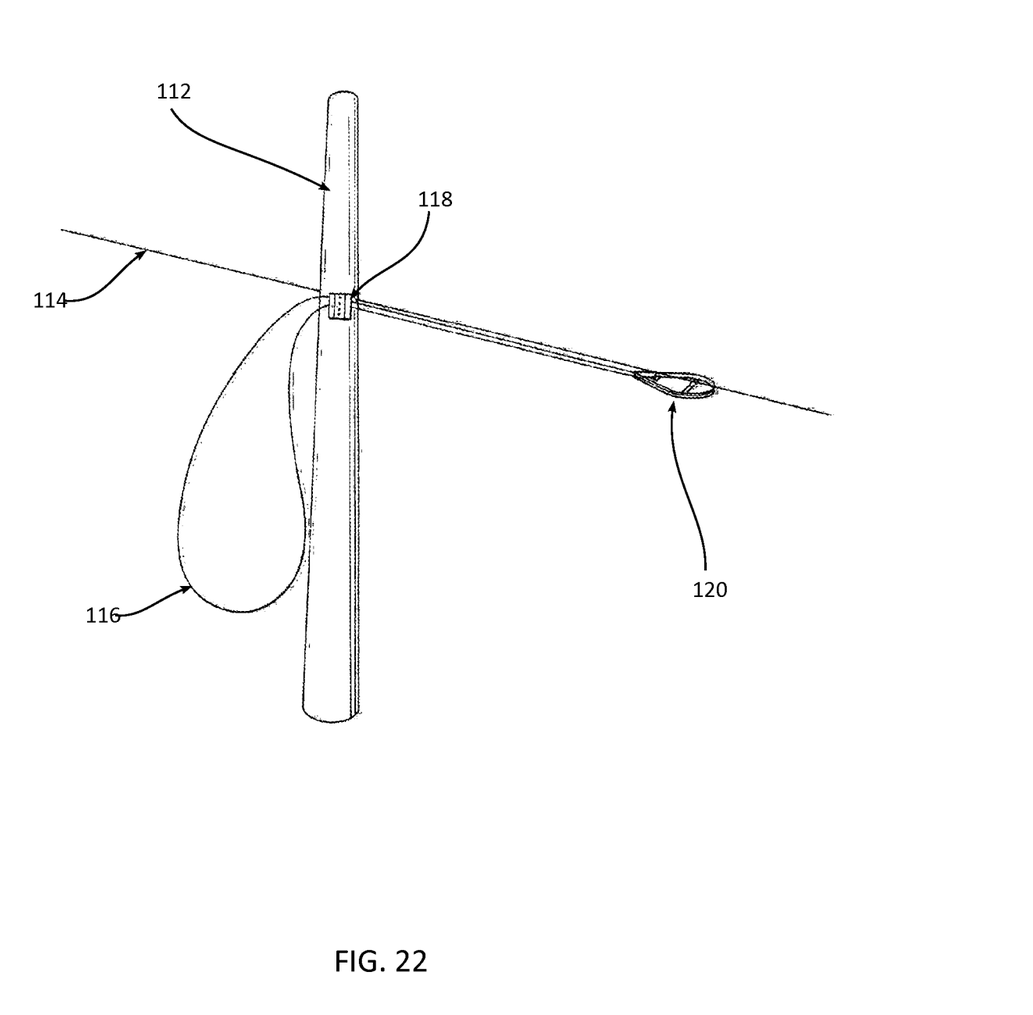
FIG. 22 is a perspective view of transmission line and cable loop with a cable support according to an exemplary embodiment.

Storage of surplus cable should include measures to prevent the cable from exceeding the manufacture's minimum bending limits under variable conditions. According to an exemplary embodiment, one or more cable supports 120 attach to the cable line 114 to support the ends of the loop 116 and prevent the ends from bending beyond the minimum limit. According to the exemplary embodiment shown in FIG. 22, two portions of the loop 116 are inserted into the cable guide 118 to separate the loop 116 into a first section and a second section. A first cable support 120 receives the first section of the loop 116 and is positioned on the line 114 so that the cable is taut or otherwise stretched to a required distance. A second cable support receives the second section of the loop 116 and is positioned on the line 114 on the opposite side of the pole 112 so that the cable is taut or otherwise stretched to a required distance. The cable supports 120 may be attached to the line 114 by various mounting hardware, such as sleeves, clamps, and fasteners. The portions of the cable between the cable support 120 and the cable guide 118 can be secured to the line 114 using bands or tie wraps as needed.

Figure 23:
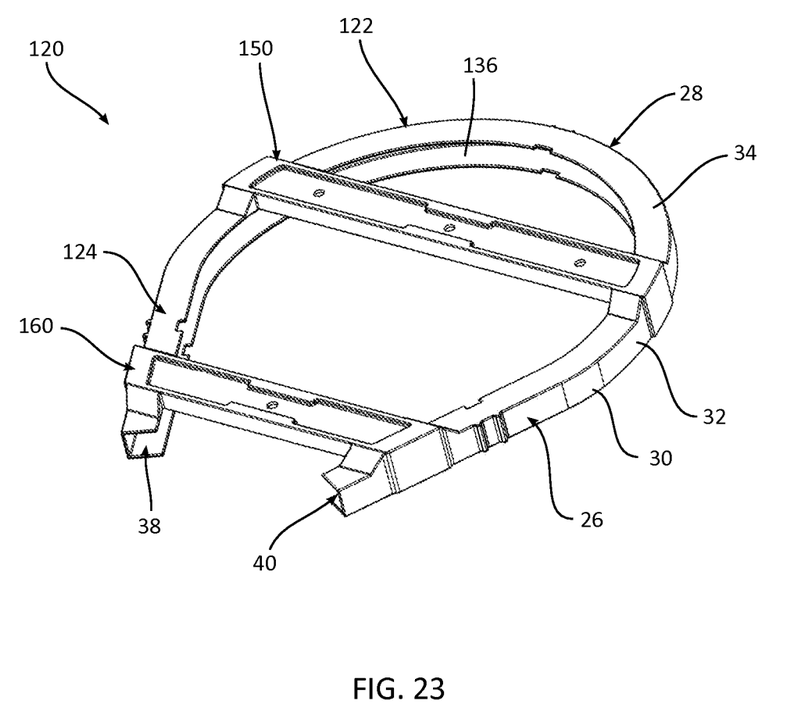
FIG. 23 is a top perspective view of a cable support according to an exemplary embodiment.
Figure 24:
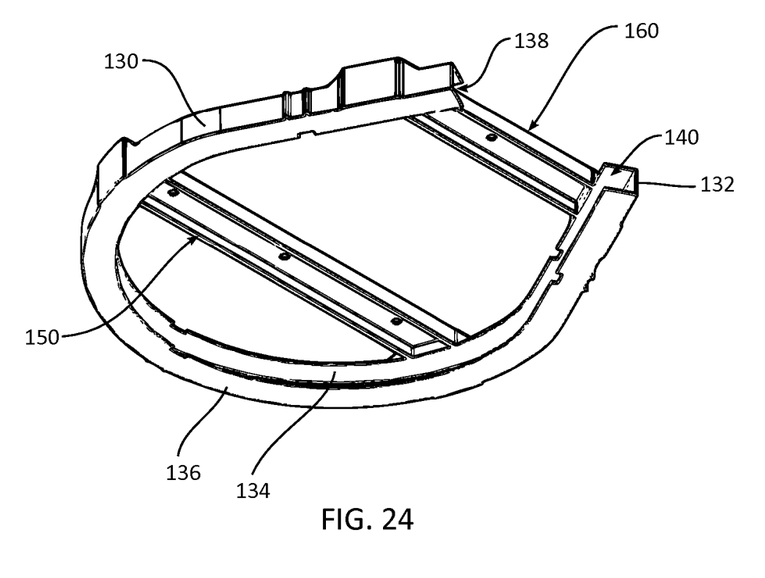
FIG. 24 is a bottom perspective view of the cable support of FIG. 23.

FIGS. 23 and 24 show an exemplary embodiment of a cable support 120. The cable support 120 includes channel member 122 having a curved portion that retains a section of the cable approximately at or above a minimum bend radius associated with the cable. In the exemplary embodiment, the cable support 120 has a substantially horseshoe-shaped channel member 122 having an open front, an angled first side section 124, an angled second side section 126, and a curved back section 128. First and second transitions 130 connect the first and second side sections 124, 126, respectively, to the back section 128. The channel member 122 includes an outer wall 132, a top flange 134, a bottom flange 136, a first open end 138, and a second open end 140. The top and bottom flanges 134, 136 extend from the outer wall towards the interior of the cable support 20 to create an inward facing channel.

Similar to the wire supports 24, the inward facing channel provides at least one advantage over a cable support having an outward or upward facing channel. For example, cables stored in the cable support will have a tendency to bow outward or upward, potentially displacing the cables from the channel and the support, and an inwardly facing channel resists this movement and helps to retain the cables.

According to a further exemplary embodiment, a first cross brace 150 extends outward from the top flange 134 and at least partially across the back section 128 of the cable support 120. The first cross brace 150 includes a top surface having a depression and one or more openings configured to receive mounting components (not shown), for example mounting brackets and fasteners, to connect the cable support 120 to the cable line 114. A second cross brace 160 extends outward from the top flange 134 from the first side section 124 to the second side section 126. The second cross brace 160 includes a top surface having a depression and one or more openings configured to receive mounting components (not shown), for example mounting brackets and fasteners, to connect the cable support 120 to the cable line 114.

In various alternative embodiments, the size, shape, and configuration of the cable support 120 varies. For example, the cable support 120 may have a closed configuration with a curved front and back. Other alternative embodiments can utilize fewer, or more than, two cross braces 150, 160 and the position of the cross braces 150, 160 may be varied from what is shown in the exemplary embodiments. The cable support 120 can be made from a plastic, metal, ceramic, or composite material, or any combination thereof. In various exemplary embodiments, the cable support 120 is made from an injection molded plastic, or other stiff, lightweight material. The cable support 120 can be a unitary or monolithic structure or it can be formed from separate connected pieces. For example, the first and second cross braces 150, 160 may be formed separately and welded to the channel member 122.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Although the organizer 20 and cable supports 24, 120 are described mainly for use with fiber optic components, such as fiber optic cable and drop wires, any of the components or exemplary embodiments described herein may be used with other cables, wires, ropes, strands, bands, or similar elements, used in the telecommunication or power industries or otherwise. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A cable supporting device comprising:
   a first support including a first channel member having a top wall, a bottom wall, and a side wall each having a first side section, a second side section, and a curved section connecting the first and second side sections, the first channel member bounding a first interior portion and having an opening facing the first interior portion;
   a second support positioned opposite the first support including a second channel member having a top wall, a bottom wall, and a side wall each having a first side section, a second side section, and a curved section connecting the first and second side sections, the second channel member bounding a second interior, and having an opening facing the second interior.

2. The cable supporting device of claim 1, wherein the respective curved sections of the first and second supports each has a radius greater than or approximately equal to the minimum bend radius of a fiber component.

3. The cable supporting device of claim 1, wherein the first and second supports are connected to a base plate.

4. The cable supporting device of claim 3, wherein the first support includes a protrusion having an aperture, and the first support is connected to the base plate by a fastener extending through the base plate and the protrusion aperture.

5. The cable supporting device of claim 3, further comprising a guide clip connected to the base plate.

6. The cable supporting device of claim 5, wherein the guide clip includes a base, a first post extending from the base, and a second post extending from the base, and the second post includes a first portion, a second portion extending at a first angle to the first portion, and a third portion extending at a second angle to the second portion.

7. The cable supporting device of claim 6, wherein the first and second angles are approximately 90 degrees.

8. The cable supporting device of claim 1, wherein the first side section and the second side section of the first support extending linearly from the curved section.

9. The cable supporting device of claim 1, wherein the first and second supports each include a first cross bar having mounting features for connecting to an aerial transmission line.

10. A cable organizer for a fiber optic component comprising:
a base plate;
a first support connected to the base plate including a first channel member having a top wall, a bottom wall, and a side wall each having a first side section, a second side section, and a back section connecting the first and second side sections having a curved region, the first channel member bounding a first interior portion and having an opening facing the first interior portion;
a second support connected to the base plate and positioned opposite the first support including a second channel member having a top wall, a bottom wall, and a side wall each having a first side section, a second side section, and a back section connecting the first and second side sections having a curved region, the second channel member bounding a second interior portion, and having an opening facing the second interior portion.

11. The cable organizer of claim 10, further comprising a first, second, third, and fourth guide clips positioned around an edge of the base plate.

12. The cable organizer of claim 10, wherein the first support includes a first protrusion having a first aperture and a second protrusion having a second aperture.

13. The cable organizer of claim 12, wherein a first fastener extend through the first aperture, a second fastener extends through the second aperture, a first nut is connected to the first fastener above the first support and a second nut is connected to the second fastener above the first support to connect the first support to the base plate.

14. The cable organizer of claim 10, wherein a third support is connected to the base plate over the first support and a fourth support is connected to the base plate over the second support.

15. The cable organizer of claim 10, wherein the curved region has a radius greater than or approximately equal to the minimum bend radius of a fiber component.

16. The cable organizer of claim 10, wherein the base plate includes at least one opening sized to receive a cable therethrough.

17. The cable organizer of claim 10, wherein the base plate includes a plurality of openings separated by at least one support, the combined area of the plurality of openings and the at least one support being at least equal to the combined area of the first and second interior portions.

18. The cable organizer of claim 10, wherein the base plate is positioned in the interior of an enclosure.

19. The cable organizer of claim 10, further comprising a multi-port terminal connected to the base plate.

20. A method of organizing a fiber optic cable and drop wires comprising:
inserting a fiber optic cable into an enclosure containing an organizer including a base plate, a first support connected to the base plate having a first channel member with a curved region and a first open side, a second support aligned with the first support having a second channel member with a curved region and a second open side, the first and second supports defining a first region therebetween, and a guide clip positioned outside of the first region;
passing the fiber optic cable through at least one of the guide clips;
separating a drop wire from the fiber optic cable;
placing at least a portion of the drop wire into the first channel member and the second channel member.

* * * * *